United States Patent [19]

Baird et al.

[11] 3,980,986

[45] Sept. 14, 1976

[54] OIL WELL SURVEY TOOL

[76] Inventors: Charles Baird, 77 Olive St., Oak View, Calif. 93022; William B. Plum, 611 Colina Vista, Ventura, Calif. 93003

[22] Filed: June 13, 1974

[21] Appl. No.: 478,907

[52] U.S. Cl. ............................... 340/18 R; 175/45; 340/15.5 BH; 340/17 R
[51] Int. Cl.² ..................... G01V 1/00; E21B 47/02
[58] Field of Search ................ 340/18 R, 18 DC, 9, 340/17 R, 15.5 BH; 175/40, 45

[56] References Cited
UNITED STATES PATENTS

| | | | |
|---|---|---|---|
| 2,062,151 | 11/1936 | Weatherby | 340/15.5 BH |
| 3,593,257 | 7/1971 | Massa, Jr. | 340/9 |
| 3,790,930 | 2/1974 | Lamel et al. | 340/15.5 SW |
| 3,817,345 | 6/1974 | Bailey | 340/18 DC |
| 3,876,016 | 4/1975 | Stinson | 175/45 |

*Primary Examiner*—Maynard R. Wilbur
*Assistant Examiner*—S. C. Buczinski
*Attorney, Agent, or Firm*—Evert A. Autrey

[57] ABSTRACT

A method for finding the position of a drill bit working at the bottom of a borehole comprising sending ultrasonic energy down the drill stem, recording the energy radiated from the drill bit through the earth to an array of geophones around the wellhead on the surface, and calculating the distance from the drill bit to each geophone. The drilling mud surrounding the drill stem absorbs the slight amount of ultrasonic energy that escapes laterally so that substantially all of the effective signal is generated at the bottom of the hole where the drill bit is working.

1 Claim, 5 Drawing Figures

OIL WELL SURVEY TOOL

BACKGROUND OF THE INVENTION

This invention relates generally to apparatus for indicating the location of the drill bit at the bottom of a well bore and in particular to apparatus for generating a sonic signal at the drill bit which can be detected at the surface in a manner to permit calculation of the location of the drill bit.

It is desirable for a driller to know at all times the location of the low side of the hole. Previously known methods for providing such information include placing complex mechanical and electronic equipment in the bore hole, usually just above the drill bit, and sending electrical information back through wires, or sonic information along the drill pipe or through the drilling mud. The rotation of the drill stem and the harsh environment combine to make these previously known methods generally unsatisfactory. Photographic recording of borehole data has also been investigated but recovery of the acquired information is slow and costly due to the effort involved in pulling the bit out of the hole to recover the exposed film.

SUMMARY OF THE INVENTION

In the instant invention sonic energy is fed into the drill stem by means of driving elements mounted on a nonrotating section of the swivel which directs the flow of drilling mud from the nonrotating feed hose to the rotating drill stem. The sonic energy is conducted to the drill bit from whence it is radiated. The energy reaching the surface through the earth is detected by transducers arranged in a configuration enabling the ready calculation of the position of the low point of the borehole relative to the wellhead.

An object of the invention is to provide an improved method and apparatus wherein sonic energy is utilized for reliably and accurately locating drill bit position.

Other objects and many of the attendant advantages of this invention will be readily appreciated as the same becomes better understood by reference to the following description.

DESCRIPTION OF SPECIFIC EMBODIMENTS

Figure 1:
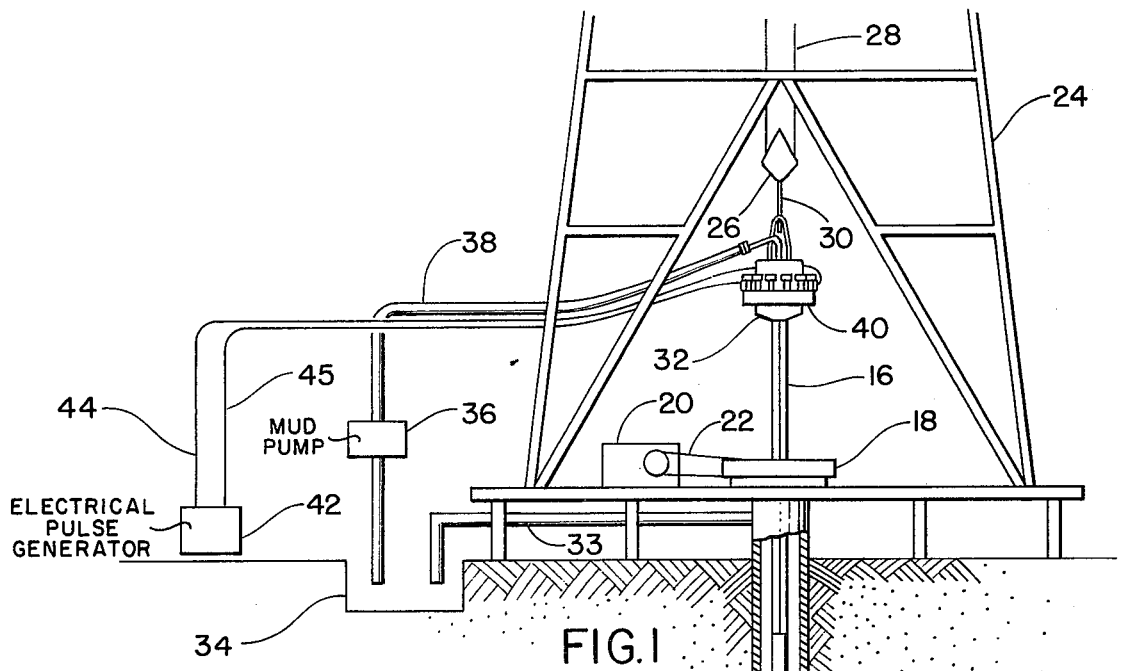
FIG. 1 is a diagrammatic view showing sonic driving elements in relation to the well drilling apparatus with which they are used.

In FIG. 1, a well 10 is shown with associated equipment for rotary drilling procedures. Drilling operations are carried out utilizing a drill bit 12 attached to the lower end of drill string 14 made up of lengths of pipes coupled by threaded connectors and terminated at its upper end by a polygonal kelly 16 which extends through rotary table 18 on the floor of the drilling rig. The rotary table is powered by a prime mover 20 through a suitable mechanism such as chain drive 22 as will be readily understood by those skilled in the art. The derrick structure 24 supports a crown block, not shown, from which is suspended traveling block 26 by means of cable 28. Hook 30 is attached to traveling block 26 and supports rotary swivel 32 which permits rotation of the drill string relative to the hook and traveling block. Drilling mud from a container or mud pit 34 is circulated through pump 36 through flexible hose 38 into swivel 32 and thence downwardly through the hollow interior of drill string 14 to bit 12. The drilling mud flows around the outside of the drill pipe to reach the surface and is returned through pipe 33 to mud pit 34 for recirculation.

Sonic generator 40 is secured to the nonrotating part of swivel 32 and when energized imparts an up and down motion to the entire drill stem. Electrical power from source 42 is fed to generator 40 through wires or cables 44 and 45 dressed along hose 38. Geophones, not shown, are positioned around the well head on the surface of the earth and are connected by means of cables to conventional signal processing equipment comprising recorders, oscilloscopes, and computer elements.

Figure 2:
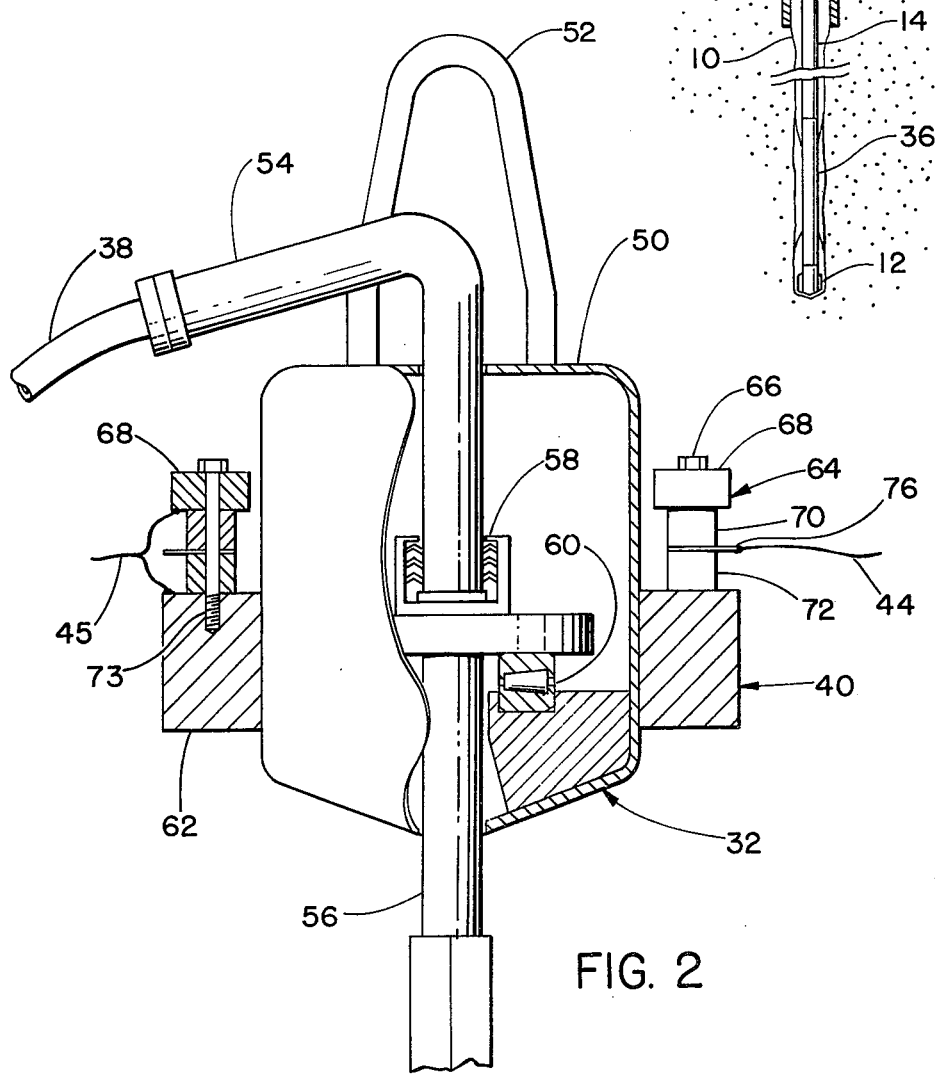
FIG. 2 is an enlarged view, partly in section, of driving transducers in relation to the swivel.

FIG. 2 shows an enlarged view of swivel 32 and sonic generator 40. The swivel comprises a body 50 provided with a bail 52, a gooseneck 54 for incoming drilling mud pumped through hose 38, sleeve 56, pipe packing 58, main bearing 60, and various radial and thrust bearings, not shown. A heavy solid metal collar 62 is secured to body 50, and piezoelectric driving transducers 64 are coupled tightly to collar 62. Each driving transducer of the 20 or so required is made up of bolt 66 passing through the center of metal inertia slug 68, upper piezoelectric element 70, and lower piezoelectric element 72. The lower threaded end of bolt 66 engages threaded holes 73 in collar 62 so the transducers can be tightened thereto. The upper and lower surfaces of piezoelectric elements 70 and 72 are metallized and the elements are polarized in accordance with well known procedures in the art so they act in concert when energized. Lead 44 from power supply 42 is connected to metal washer 76 at the center of the two adjacent elements. The upper surface of element 70 and the lower surface of element 72 are connected in common through lead 45 to the second side of the power supply. Slug 68, which may be made of steel or other relatively heavy metal, provides a mass that the piezoelectric elements work against when energized to drive collar 62. Each driving transducer is rated at 100 watts and is driven in phase with all other transducers arranged in a circle on the upper surface of collar 62.

In the operation of the apparatus thus far described, electrical energy at about 25 kiloherz from source 42 is fed to driving transducers 64 which convert the electrical energy to a mechanical up and down motion which drives the entire drill string through various points of contact in the swivel. The pulse motion is almost entirely along the axis of the drill string. The small amount of ultrasonic energy that escapes laterally is absorbed by the drilling mud so there is no contamination of signals from the drill bit to the geophones from this source. The ultrasonic generator on the swivel is operated for about one millisecond at a time. A transducer on the swivel, which may be one of the driving piezoelectric elements or a geophone, will record the elapsed time for the sound to go to the drill bit at the bottom of the hole and return. This elapsed time is $2T_o$, where $T_o$ is the time required for the sound to travel down the drill pipe. When the sound wave arrives at the bottom of the hole to the bit, it is sent out in all directions. The arrival time at each of the transducers or geophones in the pattern as hereinafter described is recorded on an oscillograph and is also fed into the computer through an analogue to digital converter. When the time $T_o$ is subtracted from each of the arrival times, the resultant time $T_x$ is the time required for the sound wave to travel through the ground to each of the geophones. The respective distances may then be determined when we measure the average velocity in the formation as discussed more fully below.

Figure 3:
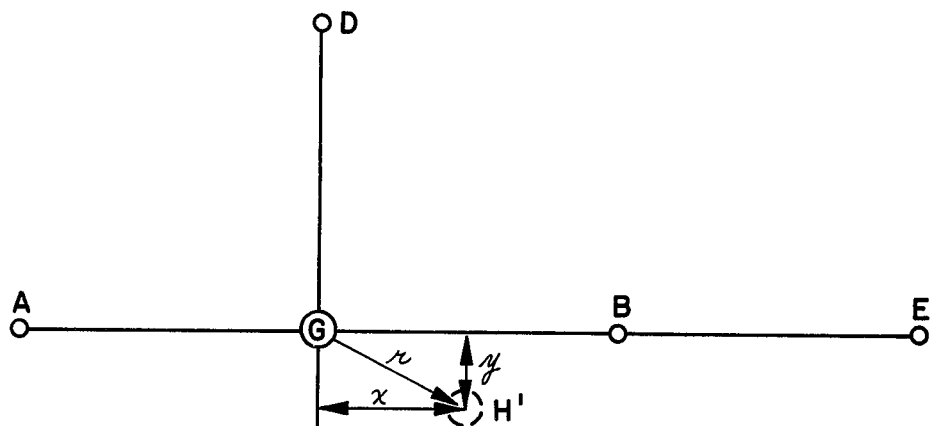
FIG. 3 is a top view of the layout of the instruments utilized in carrying out the determination of bit position.

FIG. 3 is a top view of the layout for the instruments. G is the location of the sonic generator. Geophones are placed at positions A, B, C, D, and E. The distances AG, BG, CG, DG, and BE are all equal to a predetermined distance L. H' is the projection of the low side of the hole to the surface, $x$ is the distance along the line GB and $y$ is the distance along the line GC, $r$ is the distance between H' and G. This value, $r = (x^2 + y^2)^{1/2}$. The angle between GB and BH' may be obtained by means of a table of trigonometric functions. The tangent of this angle is equal to the value of $y$ divided by $x$.

Figure 4:
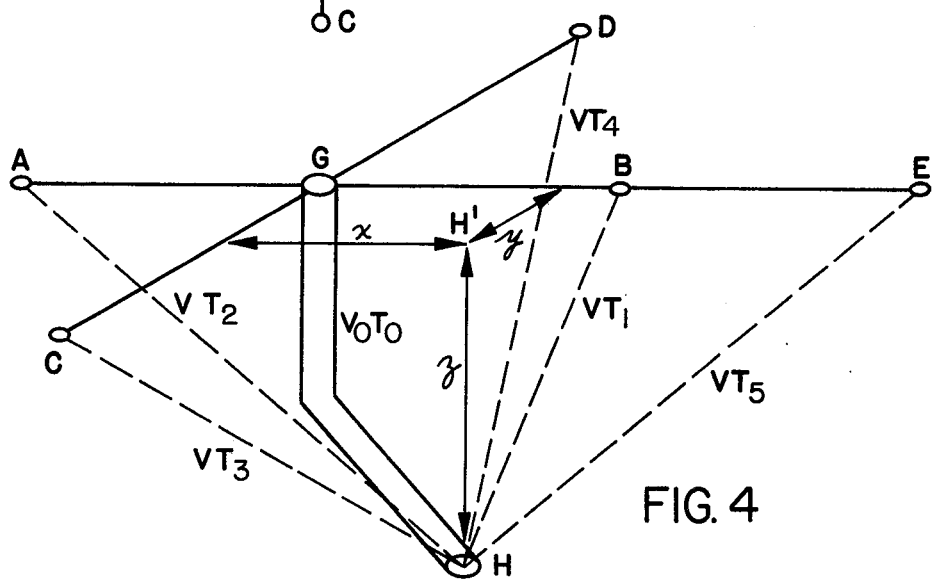
FIG. 4 is an isometric view of spatial relationships useful in calculating borehole location.

FIG. 4 is an isometric view of the drill pipe and the bottom or low side of the hole, H. The sound wave travels down the drill pipe to the bit where some of the sound is reflected back up the pipe to the generator, G. Some of the sound energy is sent out in all directions through the underground formations. The computer monitors the time required for this sound wave to reach each of the geophones, A, B, C, D, and E. When we determined the wave velocity, V, in the earth, then we can obtain the distances from the low side of the hole to the geophones. For example, the distance AH is found by multiplying the time $T_2$ by V. A similar method is used to find each of the other distances. All of the arithmetic is carried out in the computer. While we are drilling a hole straight down into the earth, all of the times to A, B, C, and D will be equal. Since these times are equal, the distances will be equal. We begin to get a difference in time when the drift angle is introduced. The time required for the signal to travel to each geophone is equal to the time it takes the sound to leave the generator, travel to the bottom of the hole, travel to the geophones minus the time required for the sound to travel to the bottom of the hole. The time, $T_o$, for the sound to travel to the bottom of the hole is one-half the time required to travel down and back up. Our computer measures this time.

In order to solve the equations, it is necessary to know the velocity of the wave in the earth. Geophone E is required for this determination. The following equation is used to obtain the velocity, V:

$$V^2 = \frac{(GE)^2 - (GB)^2}{T_5^2 - T_1^2} = \frac{3L^2}{T_5^2 - T_1^2} \tag{1}$$

Since all of the quantities on the right side of equation may be measured or determined, the velocity, V, in the earth is readily obtained.

Figure 5:
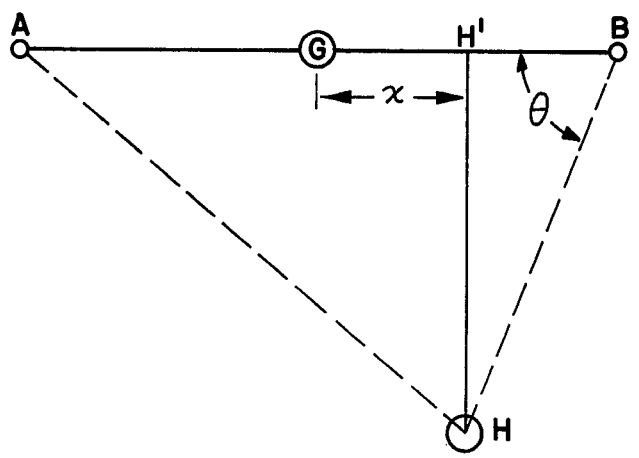
FIG. 5 is a side view showing the relationships useful for calculating angle of deviation and hole depth.

FIG. 5 is a side view. Since three points determine a plane, consider the plane ABH. AB is now equal to 2L, AH is equal to $VT_2$ and BH is equal to $VT_1$. Since all of the quantities are known, we may now find the angle $\theta$ by using the law of cosines:

$$(AH)^2 = 4L^2 + (BH)^2 - 2(2L)(BH) \text{ cosine } \theta \tag{2}$$

All of the quantities in this equation are known except the angle $\theta$, therefore we may solve this equation for angle $\theta$. The distance BH may be obtained from the equation:

$$BH' = BH \text{ cosine } \theta \tag{3}$$

The distance, $x$, is then equal to BG - BH'. A similar method may be used to find $y$ if we use the points C and D.

The depth, $z$, of the hole, HH', may be obtained from the following equation:

$$z = HH' = BH \text{ sine } \theta \tag{4}$$

We now have a method for finding the low side of the hole during drilling without loss of time. In addition, the operator may obtain a continuous log of the average velocity down to the depth of drilling; this is an advantage. All of the above computations may be carried out in the computer. An oscilloscope may be connected in parallel with the computer to give an instant visual readout.

Obviously many modifications and variations of the present invention are possible in the light of the above teachings. It is therefore to be understood that within the scope of the appended claims the invention may be practiced otherwise than as specifically described.

What is claimed is:
1. An oil well survey tool comprising:
   a. a drill stem having one end above ground and the other end terminating in a drill bit,
   b. a swivel terminating the upper end of said drill stem,
   c. a heavy metal collar secured to the nonrotating body of said swivel,
   d. a plurality of driving transducers secured to said collar, said transducers comprising:
      aa. first and second generally cyindrical piezoelectric elements metallized on the flat end surfaces,
      bb. a bolt securing said first and second piezoelectric elements in end to end relationship to said collar,
      cc. and inertial slug secured by said bolt at the end of said piezoelectric elements away from said collar,
      dd. a first power supply lead connected to the juncture of the metallized surfaces of said piezoelectric elements, and
      ee. a second power supply lead connected in common to the metallized end surface adjacent said collar and to the metallized end surface adjacent said inertial slug,
   e. a plurality of transducers disposed on the surface around said drill stem and adapted to pick up signals through the earth transmitted by said drill bit from the vertical motion imparted by said driving means, and
   f. display means driven by the output of said transducers effective to present information on depth and position of said drill bit.

* * * * *